US007292975B2

(12) United States Patent　　(10) Patent No.: US 7,292,975 B2
Lovance et al.　　(45) Date of Patent: Nov. 6, 2007

(54) SYSTEMS AND METHODS FOR EVALUATING SPEAKER SUITABILITY FOR AUTOMATIC SPEECH RECOGNITION AIDED TRANSCRIPTION

(75) Inventors: Elizabeth M. Lovance, Waltham, MA (US); Andrew MacGinitie, Roxbury, CT (US)

(73) Assignee: Nuance Communications, Inc., Burlington, MA (US)

( * ) Notice: Subject to any disclaimer, the term of this patent is extended or adjusted under 35 U.S.C. 154(b) by 807 days.

(21) Appl. No.: 10/424,134

(22) Filed: Apr. 28, 2003
(Under 37 CFR 1.47)

(65) Prior Publication Data

US 2004/0049385 A1　Mar. 11, 2004

Related U.S. Application Data

(60) Provisional application No. 60/376,548, filed on May 1, 2002, provisional application No. 60/376,547, filed on May 1, 2002.

(51) Int. Cl.
*G10L 15/26* (2006.01)
(52) U.S. Cl. ....................... 704/235; 704/235
(58) Field of Classification Search ................ 704/235, 704/260
See application file for complete search history.

(56) References Cited

U.S. PATENT DOCUMENTS

| 5,036,539 | A | 7/1991 | Wrench, Jr. et al. |
| 5,179,627 | A | 1/1993 | Sweet et al. ................... 395/2 |
| 5,333,275 | A | 7/1994 | Wheatley et al. .......... 395/2.52 |
| 5,513,298 | A | 4/1996 | Stanford et al. |
| 5,615,296 | A | 3/1997 | Stanford et al. |
| 5,649,060 | A | 7/1997 | Ellozy et al. .............. 395/2.87 |

(Continued)

FOREIGN PATENT DOCUMENTS

JP　　2000172483　　6/2000

(Continued)

OTHER PUBLICATIONS

Astley, et al., Customizeable Middleware for Modular Distributed Software, Communication of the ACM, May 2001, 1st paragraph p. 100, inset p. 101, last ½ of center column.

(Continued)

*Primary Examiner*—Angela Armstrong
(74) *Attorney, Agent, or Firm*—Kelley Drye & Warren LLP (57) ABSTRACT

The invention is a method for determining the most efficient mode of transcription in a transcription system utilizing both a human transcriptionist and automated speech recognition, and systems employing this method. The invention allows determination of speaker suitability for automated speech recognition based on voice files that have already been transcribed by a human transcriptionist, and thus does not generally require a speaker to read a transcript and does not generally require a transcriptionist to transcribe a voice file specifically for the purposes of the determination. The invention allows one of several different modes of transcription to be associated with the speaker, and provides a method for determining which of these several different modes would maximize the efficiency of the transcription system for transcribing voice files generated by the speaker.

13 Claims, 2 Drawing Sheets

U.S. PATENT DOCUMENTS

| | | |
|---|---|---|
| 5,664,195 A | 9/1997 | Chatterji |
| 5,727,950 A | 3/1998 | Cook et al. |
| 5,772,585 A | 6/1998 | Lavin et al. ............... 600/300 |
| 5,787,230 A | 7/1998 | Lee ........................ 395/2.44 |
| 5,799,273 A | 8/1998 | Mitchell et al. |
| 5,819,220 A | 10/1998 | Sarukkai et al. |
| 5,848,390 A | 12/1998 | Matsumoto ................ 704/260 |
| 5,884,262 A | 3/1999 | Wise et al. |
| 5,893,134 A | 4/1999 | O'Donoghue et al. ...... 707/536 |
| 6,058,104 A | 5/2000 | Snelling et al. |
| 6,058,426 A | 5/2000 | Godwin et al. |
| 6,064,957 A | 5/2000 | Brandow et al. ........... 704/235 |
| 6,076,059 A | 6/2000 | Glickman et al. .......... 704/260 |
| 6,081,780 A | 6/2000 | Lumelsky |
| 6,094,635 A | 7/2000 | Scholz et al. |
| 6,101,467 A | 8/2000 | Bartosik |
| 6,122,613 A | 9/2000 | Baker ........................ 704/235 |
| 6,122,614 A * | 9/2000 | Kahn et al. ................ 704/235 |
| 6,125,284 A | 9/2000 | Moore et al. |
| 6,163,794 A | 12/2000 | Lange et al. |
| 6,173,259 B1 | 1/2001 | Bijl et al. |
| 6,192,339 B1 | 2/2001 | Cox |
| 6,195,641 B1 | 2/2001 | Loring et al. ............... 704/275 |
| 6,208,964 B1 | 3/2001 | Sabourin .................... 704/244 |
| 6,260,011 B1 | 7/2001 | Heckerman et al. ........ 704/235 |
| 6,263,308 B1 | 7/2001 | Heckerman et al. ........ 704/231 |
| 6,269,188 B1 | 7/2001 | Jamali ....................... 382/229 |
| 6,282,652 B1 | 8/2001 | Scheifler |
| 6,298,326 B1 | 10/2001 | Feller ........................ 704/270 |
| 6,308,158 B1 | 10/2001 | Kuhnen et al. ............ 704/275 |
| 6,311,242 B1 | 10/2001 | Falkenburg et al. |
| 6,327,568 B1 | 12/2001 | Joost |
| 6,338,038 B1 | 1/2002 | Hanson ...................... 704/500 |
| 6,366,882 B1 | 4/2002 | Bijl et al. ................... 704/235 |
| 6,434,526 B1 | 8/2002 | Cilurzo et al. |
| 6,513,010 B1 | 1/2003 | Lewin et al. |
| 6,526,380 B1 | 2/2003 | Thelen et al. |
| 6,535,849 B1 | 3/2003 | Pakhomov et al. |
| 6,654,793 B1 | 11/2003 | Wollrath et al. |
| 6,757,655 B1 | 6/2004 | Besling et al. |
| 6,760,697 B1 | 7/2004 | Neumeyer et al. |
| 6,766,294 B2 | 7/2004 | MacGinite et al. |
| 6,785,654 B2 | 8/2004 | Cyr et al. |
| 7,006,967 B1 * | 2/2006 | Kahn et al. ................ 704/235 |
| 7,016,835 B2 * | 3/2006 | Eide et al. .................. 704/231 |
| 7,016,844 B2 * | 3/2006 | Othmer et al. ........... 704/270.1 |
| 2001/0020226 A1 | 9/2001 | Minamino et al. .......... 704/251 |
| 2001/0029452 A1 | 10/2001 | Chen .......................... 704/251 |
| 2002/0055845 A1 | 5/2002 | Ueda et al. |
| 2002/0091527 A1 | 7/2002 | Shiau |
| 2002/0138276 A1 | 9/2002 | Damiba |
| 2002/0194000 A1 | 12/2002 | Bennett et al. |
| 2003/0083879 A1 | 5/2003 | Cyr et al. |
| 2003/0083883 A1 | 5/2003 | Cyr et al. |
| 2004/0088162 A1 | 5/2004 | He et al. |

FOREIGN PATENT DOCUMENTS

| | | |
|---|---|---|
| JP | 20022091477 | 3/2002 |
| WO | WO 00/54252 | 9/2000 |

OTHER PUBLICATIONS

Liskov, Primitive for Distributed Computing, CS Lab, MIT, ACM SIG on Operating Systems, pp. 38, section 3.3 $2^{nd}$ ; p. 35 $2^{nd}$ paragraph.

Elmasri/Navathe, Fundamentals of Database Systems, pp. 76-79.

Hundt, et al., Speech Processing in Radiology, pp. 1451-1456.

F. Jelinek, Self-Organized Language Modeling for Speech Recognition, pp. 450-505.

Leggetter/Woodland, Maximum Likelihood Linear Regression for Speaker Adaptation of Continuous Density Hidden Markov Models, pp. 171-185.

Neumeyer, et al., A Comparative Study of Speaker Adaptation Techniques, pp. 1127-1130.

Shinoda, et al., Unsupervised Adaptation Using Structural Bayes Approach, pp. 793-796.

Zick, et al., Voice Recognition Software Versus a Traditional Transcription Service for Physician Charting in the ED, pp. 295-298.

Clercq, "RPC Dynamic Port Allocation", Aug. 21, 2001, Available at www.winnetmag.com/Article/ArticleID/22206/22206.html.

Srinivasan "Binding Protocols for ONC RPC Version2", RFC 1833, Aug. 1995, Availabe at www.faqs.org/rfcs/frc 1833.html.

Srinivasan, "Remote Procedure Call Protocol Version 2"; RFC 1831, Aug. 1995, Available at www.faqs.org/rfcs/rfc1831.html.

A.S. Tanenbaum, "Distributed opearing systems anno 1992. What have we learned so far?", 1993, Distributed Systems Engineering 1, p. 3-10.

* cited by examiner

SYSTEMS AND METHODS FOR EVALUATING SPEAKER SUITABILITY FOR AUTOMATIC SPEECH RECOGNITION AIDED TRANSCRIPTION

RELATED APPLICATIONS

This application claims the benefit of priority to U.S. Provisional Patent Applications Ser. No. 60/376,548, filed May 1, 2002 and Ser. No. 60/376,547, filed May 1, 2002, both applications incorporated herein by reference. This application is directed to subject matter related to that disclosed and claimed in U.S. patent application Ser. No. 10/424,140, entitled "Systems and Methods for Automatic Acoustic Speaker Adaptation in Computer-Assisted Transcription Systems," filed Apr. 28, 2003, incorporated herein by reference.

FIELD OF THE INVENTION

The present invention relates generally to systems and methods for evaluating speakers in a transcription system. Specifically, the invention relates to speaker evaluation systems and methods for optimizing a transcription system that uses human transcriptionists and automated speech recognition by determining the mode of transcription of particular speakers based on the speakers' suitability for using automatic speech recognition aided transcription systems.

BACKGROUND OF THE INVENTION

In traditional transcription systems, a speaker is identified and recorded onto a recording medium, where the recording medium is either analog or digitally based. A speaker may dictate reports and the like into the system using a traditional recording device such as a standard telephone, a hand-held recording device, or a microphone connected to a computer. The recording or audio file may be transmitted physically or electronically to a central database known as a voice server. A voice server may store multiple records for multiple speakers and may be located offsite from the speaker, for example on the premises of a professional database administrator. An audio file may be routed from the voice server to a predetermined transcriptionist or a recording may be physically transmitted to a transcriptionist, who may transcribe the audio file the traditional way by listening to the full audio file or recording and type up a new document.

Such transcription systems are quite common in the medical field. In the medical field, it is often critical that transcriptions be legible, accurate, and timely completed. One common way medical transcripts are generated is that a physician or other medical processional dictates a report over a telephone line into a central recording system. A medical transcriptionist ("MT"), who may be employed by a hospital, clinic or a third party transcription service, may access the central recording system via telephone, computer, or other traditional manner. The physician dictated recording may be played back as the MT transcribes a medical document. Once the medical document is complete it may be forwarded to the physician or medical professional for final editing. This method has been found to be costly and time consuming. Given the nature of information contained in medical records it is important to transcribe medical records quickly, efficiently, and accurately.

A drawback of traditional transcription methods as applied to the medical field is that the recording that MT's must listen to, and type a document from, tend to have low audio quality. Most telephone systems typically are not optimized to produce high quality audio and instead they tend to produce very poor quality audio. Physicians and medical professionals may also be dictating in a noisy environment such as a busy hospital or clinic, thus resulting in a large amount of background noise. Consequently, there is often significant variance in the audio quality in the recording which requires transcription.

Additionally, transcribed medical records produced from audio files created by medical professionals often require a great deal of editing in order to provide a specified medical document. The nature of medical documents typically requires customized text formatting, substantive text location, organizing, and technical word recognition not required in other professions. General patient history information may also be included in a particular document with customized formatting and text location and placement before the physician is provided with a final document. Therefore, the MT may not type a literal or truthful transcript of the recording, but rather may produce a formatted document often referred to as a finished document. Customization to produce finished documents, as many medical documents require, increases the costs of transcription and the time associated with producing such documents.

Modem transcription methods often incorporate the use of an Automatic Speech Recognition ("ASR") system in which a digital audio file undergoes analysis by a computer software program commonly known as a recognition engine, which produces a text document from the audio file. ASR systems map an acoustic signal generated by spoken words to a string of words that most likely represent the spoken words. The underlying techniques to perform this mapping are data-driven statistical pattern-recognition methods.

A typical ASR system consists of five basic components: (a) a signal processor module, (b) a decoder module, (c) an adaptation module, (d) language models, and (e) acoustic models. The signal processor module extracts feature vectors from the voice signal for the decoder. The decoder uses both acoustic and language models to generate the word sequence that is most likely for the given feature vectors. The feature vectors and resulting word sequences can also provide information used by the adaptation module to modify either the acoustic or language models for improved future speech recognition performance.

Different applications of speech recognition technology place different constraints on these ASR systems and require different algorithms. ASR systems used for transcription typically are Large-Vocabulary Continuous Speech Recognition (LVCSR) systems with vocabularies ranging from roughly 5,000 to 50,000 words. The term "continuous" denotes that speech has words that are run together as in natural speech (in contrast to "isolated word" speech recognition in which each word is surrounded by pauses). ASR systems used for transcription usually are "speaker independent." Speaker independent systems can recognize speech from a speaker whose speech has never been presented to the system before. Recognition can be improved by adapting the speaker independent acoustic models to more closely model an individual speaker's voice thus creating a speaker dependent model, and by adding user or site specific vocabulary and word usage to language models thus creating topic language models. Although ASR systems may improve overall efficiency in modem transcription methods, it has been found that not all speakers are good candidates for transcription systems that apply ASR methods.

In cases where a speaker may not be a good candidate for ASR it has been found that traditional manual transcriptions or a combination of manual and ASR methods may be more efficient. However, in order to determine which method of transcription is best suited for a particular speaker, a modern transcription system incorporating ASR must typically be implemented and the results of the transcription must be analyzed. An ASR transcription system is a costly investment which should be made only when it has been determined that enough of the physicians or medical professionals are well suited to use such an ASR transcription system that such a system would be economical. Even when it is known that a number of users of a transcription system are well suited to use ASR, the efficiency of transcription systems can be improved if it can be determined which of the users is well suited for ASR. There is thus a need for a system or method of determining whether a speaker is well suited for ASR aided transcription.

Prior methods for determining whether a speaker is suitable for an ASR system required the generation or creation of documents whose sole purpose was for scoring. These methods required a speaker to read predetermined text to create an voice file that was transcribed by ASR, and the transcription was compared to the original document from which the speaker read. Other prior methods involved a simple manual comparison of a transcript produced by a transcriptionist with an ASR produced transcript. A subjective evaluation of whether there were too many discrepancies between the two was the only measure of speaker suitability. Such prior systems produce no objective estimates of the amount of work necessary to transform recognized text into a finished document, and do not include multiple evaluations. Thus there is a need in the art for an automated and objective test of whether a speaker is suitable for ASR in order to provide estimates of the amount of work necessary to transform recognized text, where the test may include multiple evaluations.

Furthermore, methods involving transcript comparison in the medical field have been found to be inefficient because many medical documents require customized editing, text location and placement, and text of a technical nature. It has been found that transcription time in these cases is significantly increased parallel with the time and cost of manually evaluating a large number of documents produced by this system without a guaranteed measure of the accuracy of such transcription.

Another prior method to determine which method of transcription best suits a particular speaker incorporates analysis of audio file signal quality. This method has been found inaccurate because factors other than signal quality may contribute to overall poor audio quality such as background noise, a speaker's voice tone, inflection, or accent. Although the level of recognition accuracy and signal quality are necessary to determine a best method of transcription for a particular speaker, they do not reflect all of the information needed to confirm that a certain type of speech recognition is the most efficient method to produce a document.

OBJECTS OF THE INVENTION

Accordingly, it is an object of the invention to provide a method for determining speaker suitability for ASR aided transcription.

It is a further object of the invention to provide a method for determining speaker suitability for ASR aided transcription that allows documents to be produced using multiple methods based on speakers' scores.

It is a further object of the invention to provide a method for determining speaker suitability for ASR aided transcription that arrives at a more accurate estimate of the amount of work necessary to transform recognized text into a final document.

Another object of the invention is to provide a method for determining speaker suitability for ASR aided transcription by restricting the use of speech recognition to only parts of the document.

Still another object of the invention is to provide a method for determining speaker suitability for ASR aided transcription by suppressing silences and filled pauses.

Yet another object of the invention is to provide a method for determining speaker suitability for ASR aided transcription without recognizing full words.

It is a further object of the invention to provide a method for determining speaker suitability for ASR aided transcription that improves the efficiency and quality of the medical transcription process by making the best use of the time of transcriptionists and speakers who use the transcription system.

It is a further object of the invention to provide a method to determine whether ASR methods are best used to present the transcriptionist with a draft of the complete dictation.

It is a further object of the invention to provide a method to determine whether to filter out non-speech noises in an ASR system.

It is a further object of the invention to provide a method for determining speaker suitability for ASR aided transcription to select speakers whose speech is most efficiently transformed into final documents in a transcription system with limited resources.

SUMMARY OF THE INVENTION

Determining which transcription method best suits a particular speaker may be based on a comparison of the efficiency of using different transcription methods. Such determinations typically require a complete transcription from an audio file by a transcriptionist, a complete automated transcription by the ASR system, and a partial transcription where an ASR system generates a draft that is edited by at transcriptionist. But prior to the present invention, such comparisons should have required using at least two transcriptionists, one who generates a complete transcription, and the other who edits an ASR transcription while listening to the audio file. This approach is very labor intensive, and difficult to scale up to a system with many speakers. Such a comparison should also involve using two or more complete transcriptions from audio files and two or more edits of an ASR transcript to remove variations in outcome due to differences in the abilities of different transcriptionists in order to arrive at an objective comparison of the different methods.

The invention includes a method for determining speaker suitability for automatic speech recognition aided transcription, where the method may include accumulating a predetermined number of a speaker's voice and text files, sorting the voice and text files based upon predetermined criteria, generating ASR text files from the voice files, determining at least one score, where each score is based upon a corresponding ASR file and text file, determining a preferred mode of transcription based upon predetermined number of scores, and setting the transcription mode for the speaker.

The invention includes a method for determining a speaker's suitability for automated speech recognition in a transcription system comprising the steps of accumulating a predetermined number of the speaker's voice files and associated text files, wherein the associated text files are transcriptions of the voice files transcribed by a transcriptionist; providing a voice file to a speech recognition engine to generate a recognized text file; determining a score based on the recognized text file generated from the voice file and the associated text file of the voice file, wherein the score is based on an edit distance between the associated text file and the recognized text file, the number of pauses in the voice file, the amount of silence in the voice file, the audio quality of the voice file, the amount of correction required to bring the recognized text file into conformity with the finished text file, the amount of out of order text in the recognized text file, the amount of formatting in the associated text file, the confidence of the recognition engine in each of the tokens recognized and the ability of the recognition engine to generate a recognized text file using guided recognition, the time it takes the transcriptionist to edit a recognized text file to bring it into conformity with a finished text file, the number of keystrokes it takes the transcriptionist to edit a recognized text file to bring it into conformity with a finished text file, or any combination thereof; determining a preferred mode of transcription based on a predetermined number of scores, wherein the predetermined number of scores are scores generated from recognized text files and associated text files corresponding to voice files generated by the speaker; and setting a transcription mode for the speaker, wherein the transcription mode indicates the method of transcription thereafter used in the transcription system, and wherein the method of transcription is presenting a transcriptionist with a recognized text file for editing, presenting a transcriptionist with a voice file for transcribing, wherein non-speech noises have been removed from the voice file using automated speech recognition, or presenting the transcriptionist with a voice file for transcribing.

The invention further includes a transcription system comprising a voice server for accumulating a predetermined number of the speaker's voice files, a text server for accumulating a predetermined number of associated text files, wherein the associated text files are transcriptions of the voice files transcribed by a transcriptionist; a speech recognition engine, wherein a voice file is provided to said speech recognition engine and a recognized text file is generated therefrom; a means for determining a score based on the recognized text file generated from the voice file and the associated text file of the voice file, wherein the score is based on an edit distance between the associated text file and the recognized text file, the number of pauses in the voice file, the amount of silence in the voice file, the audio quality of the voice file, the amount of correction required to bring the recognized text file into conformity with the finished text file, the amount of out of order text in the recognized text file, the amount of formatting in the associated text file, the confidence of the recognition engine in each of the tokens recognized and the ability of the recognition engine to generate a recognized text file using guided recognition, the time it takes the transcriptionist to edit a recognized text file to bring it into conformity with a finished text file, the number of keystrokes it takes the transcriptionist to edit a recognized text file to bring it into conformity with a finished text file, or any combination thereof; a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the method of transcription thereafter used in the transcription system, and wherein the method of transcription is presenting a transcriptionist with a recognized text file for editing, presenting a transcriptionist with a voice file for transcribing, wherein non-speech noises have been removed from the voice file using automated speech recognition, or presenting the transcriptionist with a voice file for transcribing.

In one aspect, the invention further comprises a user database, wherein the transcription mode for the speaker is stored in the user database. In another aspect, the invention further comprises a speech recognition server, wherein the speech recognition server receives voice files form the voice server, sends voice files to the speech recognition engine, and sends recognized text files to the voice server or the text server.

It is a benefit of the invention that the entire speaker suitability determination can take place without human intervention, thus speakers may be kept unaware that they are being evaluated, and the general process of transcription can occur without interference with the normal workflow. It has been found that the efficiency of transcription systems can be increased by using ASR to generate a text followed by transcriptionist editing of the ASR generated text only on those audio files created by speakers who are well suited for ASR, and directing audio files created by speakers who are poorly suited for ASR directly to transcriptionists to generate text. The invention can improve the efficiency of transcription systems by automatically recognizing which speakers are well suited for ASR and which are poorly suited, thus allowing transcription systems to direct audio files to be transcribed in the most efficient manner based on whether the speakers who generated the audio files are well suited or poorly suited for ASR. The invention thus allows a decrease in the cost of producing transcriptions by requiring less time on the part of human transcriptionists, and it also allows a decrease in the turnaround time between when speakers complete their dictations and when final transcripts of the dictations are complete.

DETAILED DESCRIPTION OF THE INVENTION

The invention includes a system and method for determining speaker suitability for ASR that automatically determines the suitability of individual speakers for various methods of ASR document generation. The system may generate scores by comparing the direct ASR recognition results and the corresponding edited or finished texts to determine the amount of work needed to edit the automatically generated documents from the recognition results. The recognition results and finished documents may be gathered automatically in the course of regular use of the system or may be pulled from repositories of historical data. The scores produced by this system may then be provided to an algorithm to determine the most efficient methods of transforming a particular speaker's speech into a finished document.

The systems and methods of the invention provide several substantial improvements over prior methods of evaluating speaker suitability for ASR. First, the system does not need to generate documents whose only purpose is for evaluation or scoring. The system can make use of documents produced using any of a number of methods including documents produced using traditional transcription methods or using a variety of ASR-assisted methods in scoring speakers. This makes it possible to completely automate the process of matching speakers with the most appropriate methods.

Second, the system arrives at a more accurate estimate of the amount of work necessary to transform recognized text into a finished document. The desired result of an ASR task is rarely a literal transcript of what has been spoken, but rather is usually an edited and formatted version thereof referred to as a finished document, so a speaker suitability determination should take this into consideration. Furthermore, although the level of recognition accuracy and signal quality may be influential in a speaker suitability determination, these factors do not reflect all of the information needed to confirm that a certain type of speech recognition is the most efficient method to produce a document. Thus the method of the invention is superior for determining speaker suitability than methods that only consider recognition accuracy and signal quality have inferior performance.

Third, the system permits the inclusion of many types of measures that allow it to determine the suitability of a speaker, for example, edit distance, the number of pauses, the amount of silence, the amount of correction required, the time required to produce finished documents, the amount of out of order text, the quantity of formatting in the finished documents, and the confidence of the recognition engine.

Finally, the system allows many different modes within the transcription system for many different levels of speaker suitability for ASR. The different transcription modes include, for example, restricting the use of speech recognition to only parts of a document, suppressing silences and filled pauses in an audio file, or recognizing and separating speech sounds from non-speech sounds, which does not necessarily require recognition of full words.

Generating speaker suitability scores may involve a computer comparison of the text file output of a speech recognition engine (an ASR text file) to a finished text file—the text file output of a transcriptionist who edited an ASR text file or who generated a text file from the same audio file used to generate the ASR text file. Audio (speech) files and their corresponding text files may be gathered in an accumulating step as they are produced in a transcription system. These files may then be stored for later evaluation and use in determining speaker suitability for ASR. The audio and text files may also be sorted according to any of a number of predetermined criteria. For example, sorting may be based on speaker identity, so that all audio files created by a particular speaker and all of the corresponding text files may be sorted based on the identity of that speaker. Sorting may also or alternatively be based on work types, document type, transcriptionist, department, file length, or characteristics of the speaker. For example, relevant speaker characteristics for sorting purposes may include the nationality of the speaker or whether the speaker is a native or non-native English speaker. In a hospital environment, sorting may be on the basis of what source of access speakers have within each department in the hospital.

Pairs of ASR text files and finished text files corresponding to the same audio files from the same speakers can be used to generate scores that reflect the speakers' suitability for ASR. More accurate scores can typically be generated with a greater number of text files for each speaker to be evaluated, so the method may include a counter for counting the number of text files accumulated for each speaker. The method may include predetermining a number of text files that are required to achieve a desired level of accuracy. This predetermining step may be performed, for example, by generating a speaker suitability score based on a number of text files, then generating a speaker suitability score based on a greater number of text files, and repeating this process using a greater number of text files until the speaker suitability score does not change significantly between successive generating steps. The number of text files at which the speaker suitability score does not change significantly when it is based on a greater number of text files may then be selected as the predetermined number of text files. Alternatively, the predetermined number of text files can be set based on practical concerns such as the number of text files available, the amount of time available for processing, or any other relevant criteria. During normal transcription operations, the method of the invention may involve collecting a predetermined number of text files and generating a speaker suitability score based on those text files.

The scoring process may involve a determination of the amount of work it should take for a transcriptionist to edit the ASR text file into a finished file. The scoring process may involve providing an audio file to the speech recognition engine that would be used if the speaker were found to be suitable for ASR. The speech recognition engine may then provide an ASR text file. In a preferred embodiment, the ASR text file need not be a concordance file that maps the text to the spoken words, but rather may be a simple transcription of the speech on the audio file. The ASR text file and a corresponding finished text file may be used to generate a score to determine the speaker's suitability for different methods of transcription. The score may be based simply on edit distance, that is the score value of an optimal pairwise alignment.

In alternative embodiments, the score may be based on other factors, combinations of edit distance and other factors, or combinations of other factors. For example, the score may be based on certain characteristics of the audio file such as the number of pauses, the amount of silence, and/or the audio quality. The score may be based on certain characteristics of the ASR text file and/or the finished text file such as the amount of correction required to bring the ASR test file into conformity with the finished text file, the amount of out of order text, and/or the amount of extra formatting in the finished file. The score may be based on certain results of transcription provided by the recognition engine including the confidence of the recognition engine in each of the tokens recognized and/or the ability of the recognition engine to generate a recognition file using guided recognition. The score may be based on certain results of transcription that may automatically be measured during transcription by a transcriptionist such as the time it takes a transcriptionist to edit an ASR text file to bring it into conformity with a finished text file and/or the number of keystrokes it takes a transcriptionist to edit an ASR text file to bring it into conformity with a finished text file.

Any or all of the above scoring methods can be used in the present invention. Particularly useful combinations include consideration of both the amount of correction required to bring the ASR test file into conformity with the finished text file, and the time or number of keystrokes it takes a transcriptionist to edit an ASR text file to bring it into conformity with a finished text file. If extensive formatting is required, then it may take a transcriptionist a substantial amount of time to edit a file to create a finished document, even when speech recognition is very accurate for a particular speaker. The audio quality can be included in a score to diminish the possibility that poor audio quality alone would dictate that a speaker is poorly suited for ASR. Other useful combinations of scoring criteria should be readily apparent to those of skill in the art.

A preferred mode of transcription for any particular speaker may be based on that speaker's suitability score or a combination of scores from previously accumulated ASR text files and finished text files. A method for determining the preferred mode of transcription may examine the scores generated by a number of pairs of ASR text files and finished text files, and employ statistical methods to eliminate any files that are statistical outliers in order to base the preferred mode of transcription on a more accurate score. For example, if one file among many has a particularly bad audio signal or was dictated in a particularly noisy environment, that file may skew the speaker suitability score for that speaker and should thus not be used in the final determination of the p referred mode of transcription. A calculation of the preferred mode of transcription for a particular speaker may lead to the result that further evaluation is necessary before a reliable preferred mode of transcription can be calculated. If sufficient evaluation of a speaker has been done, then the preferred mode of transcription may be set based on the speaker's suitability score or combination of scores.

A number of options are available for the extent to which ASR may be used in a transcription system, and any of these options may chosen as the preferred mode of transcription for a particular speaker based on the speaker's suitability score. These options include presenting a transcriptionist with a draft of the complete dictation, where the draft is produced entirely by ASR. ASR can be used just to filter out non-speech noises from an audio file in a mode in which ASR is not necessarily used to recognize full words, thus making transcription by a human transcriptionist easier. ASR can be left out of the system if it makes too many errors in recognizing speech of a particular individual, thus leaving a human transcriptionist to do the entire transcription of audio files created by that individual. Or ASR can be used on its own without the input of a human transcriptionist if a speaker is particularly well suited for ASR and ASR seldom errs in interpreting that speaker's dictation. In circumstances where a system has a limited capacity for performing ASR (for example, due to limited network bandwidth, poor network latency, or limited computational resources), the method of the invention may be used to select those speakers whose speech is most efficiently transformed into finished documents using ASR, and thus allows the most efficient use of resources.

As shown generally in FIGS. 1 and 2, the present invention includes several features as described below. Those features include analysis of a speaker on a large scale to determine whether the best method of transcription is the traditional method of literal transcription, use of automated speech recognition, or partially assisted use of automated speech recognition. The present invention may involve determining the best method of transcription by using files gathered in a regular production environment regardless of the method of transcription used to produce such documents. The present invention may also involve classifying a speaker based upon analysis of the methods of transcription and setting a mode for a speaker corresponding to the most efficient method of transcription. The invention should be useful with any ASR system, but it is contemplated that it would be particularly useful in the system described in co-pending application Ser. No. 10/424,140, entitled "Systems and Methods for Automatic Acoustic Speaker Adaptation in Computer-Assisted Transcription Systems," incorporated herein by reference.

Figure 1:
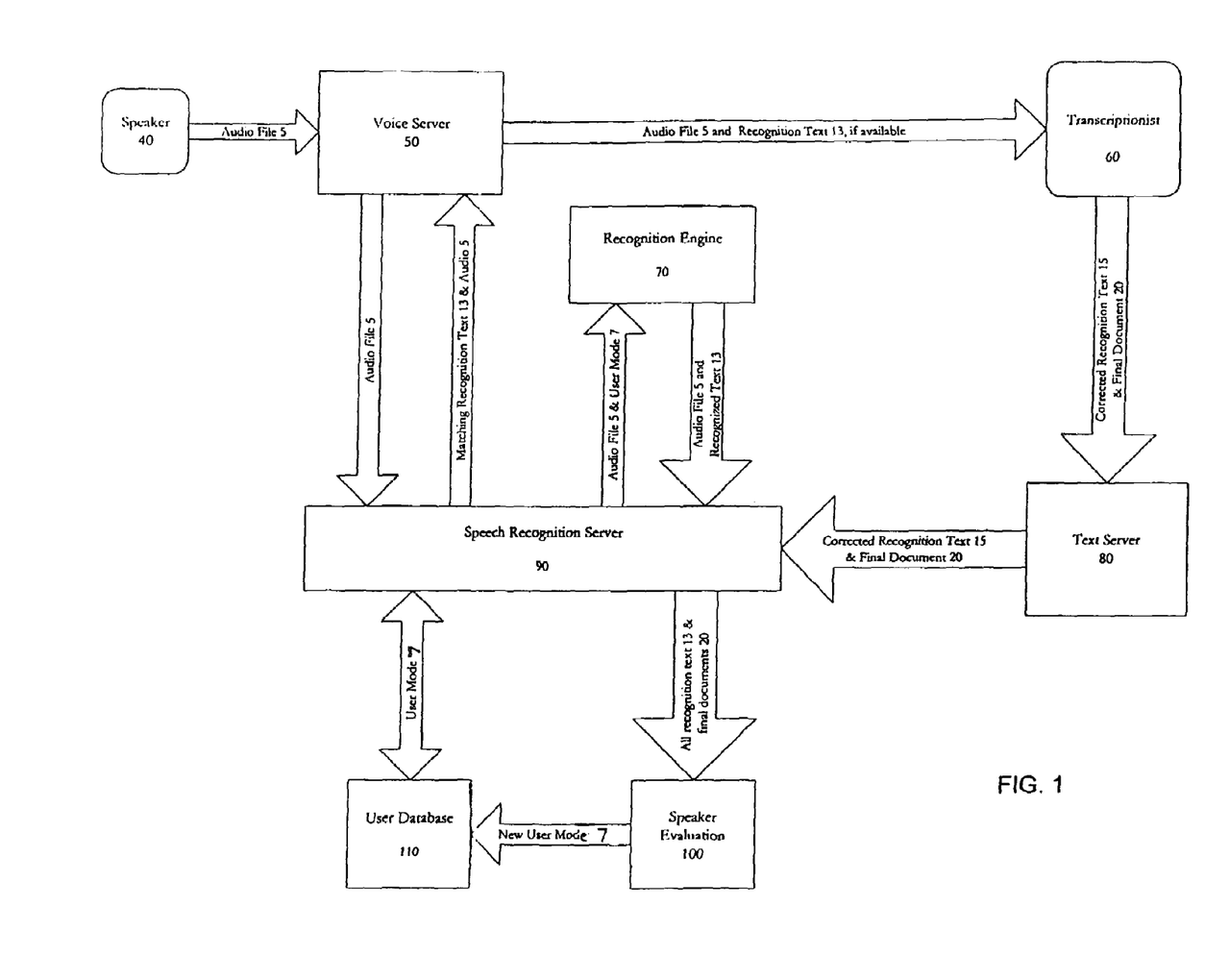
FIG. 1 is a block diagram of one embodiment of the system of the invention.

As shown in FIG. 1, a speaker 40 may be the source of audio to be recognized. Speaker 40 may dictate reports into the system using a standard telephone, a hand-held device, or any other suitable audio input device that can generate an audio file 5. The audio file 5 may be sent directly to the voice server 50. Voice server 50 may store all audio files 5 recorded by multiple speakers. Voice server 50 may also transmit audio file 5 to a transcriptionist 60 for transcription, correction, or editing. Transcriptionist 60 may be specially trained, for example in transcribing medical documents, and may be employed by a hospital, clinic, or a third party transcription service. Alternatively, transcriptionist 60 may manually access voice server 50 and retrieve audio file 5 for transcription. Additionally, transcriptionist 60 may be presented with an audio file 5 and recognized text 13, which text has been recognized by a recognition engine 70, as described in greater detail below. Recognition server 90 may receive audio files 5 and may organize the files and processes necessary for the recognition process.

Recognition engine 70 may perform the task of recognizing speech in audio files and producing recognized text 13 therefrom. The system may include multiple recognition engines 70 which may be individually controlled by the recognition server 90. Recognition of audio files 5 can occur in various modes known as user modes 7. A full or evaluation user mode may require complete analysis of an audio file 5. A partial user mode may require an analysis of predetermined portions of audio file 5 or analysis only of whether a particular audio signal is speech or background noise. A user mode set to non-speech may indicate that audio file 5 should not be analyzed for speech recognition and that this audio file should instead be transcribed manually. User mode information 7 about each speaker 40 may be stored in a user database 110. User information stored in user database 110 may also include information useful for the transcriptionist 60, such as general information about a speaker, office location, professional credentials, or other useful information. The user database 110 may also include technical information relevant in the speaker's profession. For example, if speaker 40 is a physician, the user database 110 may include general patient information including medical history, family medical history, prior treatments, and active or past prescribed medications.

Recognition server 90 may search user database 110 to determine the predetermined method of recognition and the user mode 7 for each audio file 5. An audio file 5 from a speaker 40 who has not been previously evaluated may be recognized in the full mode. After evaluation, speakers may be classified as full, partial, or non-speech recognition candidates. There may be several modes of partial recognition.

Recognition server 90 may also store copies of all audio files 5 that are dictated, edited, or modified using any or no method of recognition. Recognition server 90 sorts audio files 5 into recognition and non-recognition jobs according to the selected user mode as stored in user database 110. Recognition engine 70 may determine the pre-set method of recognition from the audio file 5 and associated user mode information 7, process audio file 5, and return recognized text 13 to the recognition server 90.

Voice server 50 may transmit audio file 5 only or alternatively, audio file 5 accompanied by recognized text 13, to transcriptionist 60. Transcriptionist 60 may manually retrieve audio file 5 and recognized text 13. Transcriptionist 60 may be notified of an impending transcription request via an email, telephone, or written prompt. Audio file 5 and recognized text 13 may be selectively formatted as determined by speaker 40, which formatting information may also be stored in user database 110. If a speaker is poorly suited for automated speech recognition, then transcriptionist 60 may transcribe the document in the traditional manner, by listening to the full audio file 5 and typing a new document. If a speaker is suited for partially automated speech recognition, then transcriptionist 60 may listen to the audio file 5 with certain portions suppressed and type a new document. If a speaker is well suited for automated speech recognition, then the transcriptionist may need only to listen to the audio file 5 and edit the recognized text 13 produced by the recognition engine 70. Once the transcriptionist 60 has completed transcribing audio file 5, and/or editing or modifying recognized text 13, a corrected recognized text document 15 and a final document 20 may be transmitted to a text server 80.

Text server 80 may receive the corrected recognized text 15 and the final document 20 produced by the transcriptionist 60, may store one copy of each and transmit another copy of each to recognition server 90. Alternatively, text server 80 may transmit a copy of the corrected recognized text 15 and the final document 20 directly to speaker 40 for final editing or modification.

Recognition server 90 may be programmed to begin speaker evaluation when a predetermined number of final documents 20 have been obtained for a particular speaker 40. The number of final documents 20 necessary to trigger speaker evaluation may be stored as a predetermined value in user database 110. When the predetermined number of final documents 20 are obtained for a particular speaker 40, copies of audio file 5 corresponding to final documents 20 may be processed by an ASR method. Alternatively, each audio file 5 corresponding to each final document 20 may be processed by an ASR method on a continuous basis. Once a predetermined number of audio files 5 and final documents 20 have been processed, speaker suitability scoring may be performed and a score report may be generated according to the process shown in FIG. 2.

Figure 2:
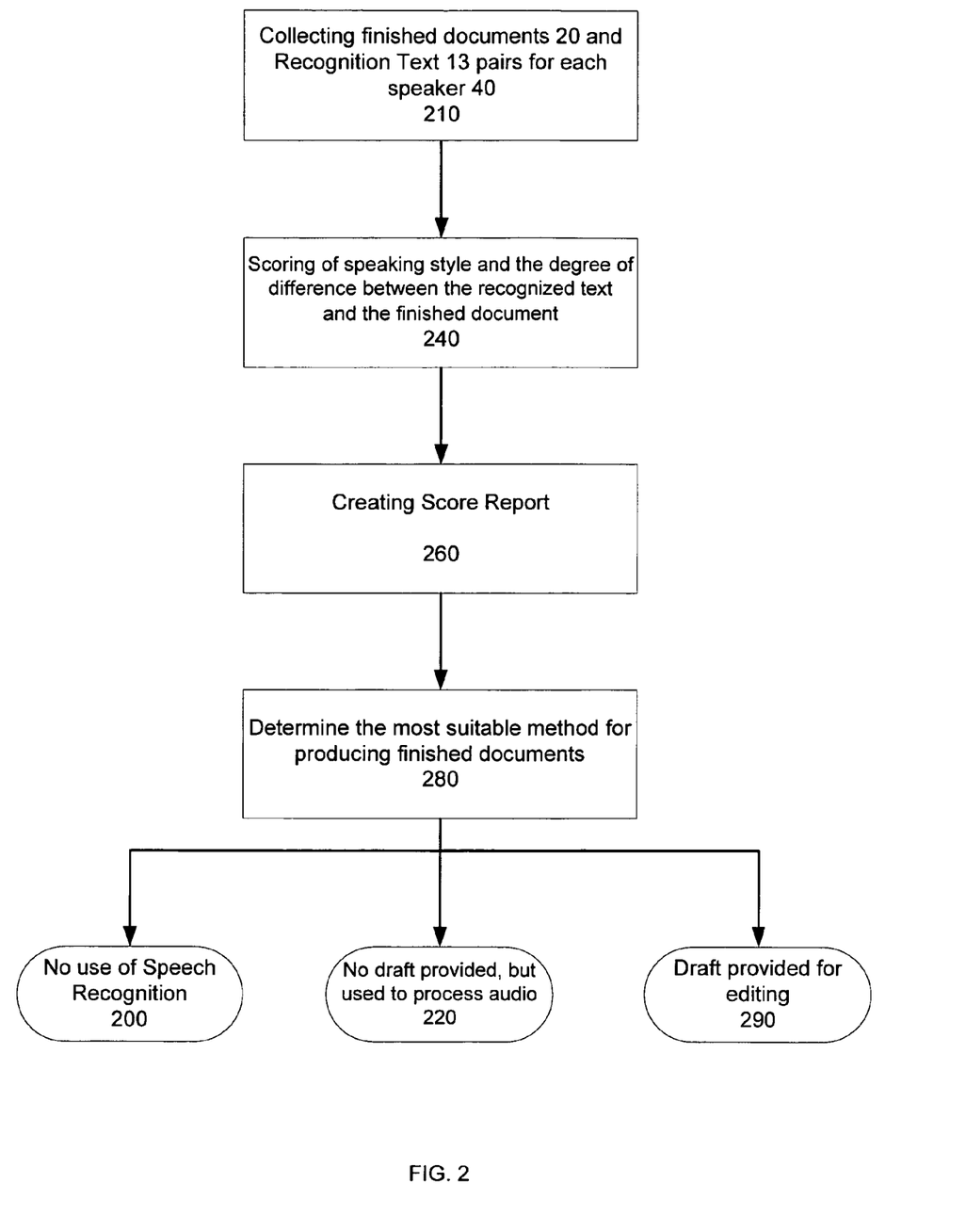
FIG. 2 is a flow diagram of one embodiment of the method of the invention.

FIG. 2 shows a flow diagram representing one embodiment of the invention. In box 210, a set of final documents 20 and corresponding recognized text 13 may be paired for each speaker 40. Final document 20 and recognition text 13 pairs may be accumulated and held until a predetermined number of such pairs have been acquired. In box 240, finished documents 20 are compared with their corresponding recognition texts 13 to determine scores for the speakers based on the degrees of differences between the recognized texts 13 and the finished documents 20.

In box 260, a score report is created for a particular speaker 40 to determine the most suitable method for producing final documents 280. Possible user modes 7 resulting from score report 160 may include no use of speech recognition 200, where the transcriptionist 60 listens to the audio file 5 and types the final document 20. Another user mode 7 resulting from score report 160 may be one in which ASR is not used to provide a draft, but ASR is used to preprocess audio file 5 in order to suppress certain parts of the audio such as silences, misspeaking, and other background noise 220. A third user mode 7 resulting from score report 260 may be as indicated in 240, in which recognized text 13 may be transmitted to transcriptionist 60 along with a simultaneous playback of audio file 5, allowing the transcriptionist to edit the draft based on the audio file, but not requiring the transcriptionist to generate a new transcription of the audio file. For speakers particularly suited to ASR, it may be possible to use ASR alone, with no additional input from a transcriptionist required (not shown).

Score report 260 may be used to determine the most suitable role for ASR in the generation of final documents 20. The score report 260 is subjected to an algorithmic analysis to determine which method is best suited for each speaker. The resulting method may then be stored in user database 110 as the speaker's preferred method for transcription. Future audio files 5 dictated by that speaker may be processed using the preferred method determined without further user intervention.

The system of the invention may be implemented on a server-based system having multiple remote users, or it may be adapted for use on a personal desktop computer. An advantage of the system of the invention is that no direct contact between a speaker and a transcriptionist is necessary. Depending on the scoring mechanism used, an additional feedback system could be included to return information to the speaker on possible changes to dictation and speaking style that might improve their suitability for full speech recognition.

Although the present invention has been described with respect to certain embodiments and examples, variations exist that are within the scope of the invention as described in the following claims.

What is claimed is:

1. A method for determining a speaker's suitability for automated speech recognition in a transcription system comprising the steps of:
    accumulating a predetermined number of the speaker's voice files and associated text files, wherein the associated text files are transcription of the voice files transcribed by a transcriptionist;
    generating a recognized text file from said voice file using a speech recognition engine;
    determining a score based on the recognized text file generated from the voice file and the associated text file of the voice file, wherein the score is based on the edit distance between the associated text file and the recognized text file, and on the results of the transcription automatically measured during transcription by a transcriptionist selected from one of (a) the time it takes the transcriptionist to edit a recognized text file into conformity with a finished document or (b) the number of keystrokes it takes the transcriptionist to edit a recognized text file to bring it into conformity with a finished text file;
    determining a preferred mode of transcription based on a predetermined number of scores, wherein the predetermined number of scores are scores generated from recognized text files and associated text files corresponding to voice files generated by the speaker; and
    setting a transcription mode for the speaker, wherein the transcription mode indicates the method of transcription thereafter used in the transcription system.

2. A method for determining a speaker's suitability for automated speech recognition in a transcription system comprising the steps of:
    accumulating a predetermined number of the speaker's voice files and associated text files, wherein the associated text files are transcription of the voice files transcribed by a transcriptionist;
    generating a recognized text file from said voice file using a speech recognition engine;

determining a score based on the recognized text file generated from the voice file and the associated text file of the voice file, wherein the score is based on the edit distance between the associated text file and the recognized text file, and on characteristics of the voice file selected from the group consisting of the number of pauses in the voice file, the amount of silence in the voice file, and the audio quality of the voice file, and on the results of transcription automatically measured during transcription by a transcriptionist selected from one of: (a) the time it takes the transcriptionist to edit a recognized text file to bring it into conformity with a finished document or (b) and the number of keystrokes it takes the transcriptionist to edit a recognized text file to bring it into conformity with a finished text file;

determining a preferred mode of transcription based on a predetermined number of scores, wherein the predetermined number of scores arc scores generated from recognized text files and associated text files corresponding to voice files generated by the speaker; and setting a transcription mode for the speaker, wherein the transcription mode indicates the method of transcription thereafter used in the transcription system.

3. A method for determining a speaker's suitability for automated speech recognition in a transcription system comprising the steps of:

accumulating a predetermined number of the speaker's voice files and associated text files, wherein the associated text files are transcription of the voice files transcribed by a transcriptionist;

generating a recognized text file from said voice file using a speech recognition engine;

determining a score based on the recognized text file generated from the voice file and the associated text file of the voice file, wherein the score is based on the edit distance between the associated text file and the recognized text file and on characteristics of the recognized text file and associated text file selected from the group consisting of the amount of correction required to bring the recognized text file into conformity with the finished text file, the amount of out of order text in the recognized text file, and the amount of formatting in the associated text file, and on results of the transcription automatically measured during transcription by a transcriptionist selected from one of (a) the time it takes the transcriptionist to edit a recognized text file to bring it into conformity with a finished document or (b) the number of keystrokes it takes the transcriptionist to edit a recognized text file to bring it into conformity with a finished text file;

determining a preferred mode of transcription based on a predetermined number of scores, wherein the predetermined number of scores are scores generated from recognized text files and associated text files corresponding to voice files generated by the speaker; and setting a transcription mode for the speaker, wherein the transcription mode indicates the method of transcription thereafter used in the transcription system.

4. A method for determining a speaker's suitability for automated speech recognition in a transcription system comprising the steps of:

accumulating a predetermined number of the speaker's voice tiles and associated text files, wherein the associated text files are transcription of the voice files transcribed by a transcriptionist;

generating a recognized text file from said voice tile using a speech recognition engine;

determining a score based on the recognized text file generated from the voice file and the associated text file of the voice file, wherein the score is based on the edit distance between the associated text file and the recognized text file and on characteristics of the voice file selected from the group consisting of the number of pauses in the voice file, the amount of silence in the voice file, and the audio quality of the voice file, and based on characteristics of the recognized text file and associated text file selected from the group consisting of the amount of correction required to bring the recognized text file into conformity with the finished text file, the amount of out of order text in the recognized text file, and the amount of formatting in the associated text file, and on the results of transcription automatically measured during transcription by a transcriptionist selected from one of (a) the time it takes the transcriptionist to edit a recognized text file to bring it into conformity with a finished document or (b) and the number of keystrokes it takes the transcriptionist to edit a recognized text file to bring it into conformity with a finished text file;

determining a preferred mode of transcription based on a predetermined number of scores, wherein the predetermined number of scores are scores generated from recognized text files and associated text files corresponding to voice files generated by the speaker; and setting a transcription mode for the speaker, wherein the transcription mode indicates the method of transcription thereafter used in the transcription system.

5. A method for determining a speaker's suitability for automated speech recognition in a transcription system comprising the steps of:

accumulating a predetermined number of the speaker's voice files and associated text files, wherein the associated text files are transcription of the voice files transcribed by a transcriptionist;

generating a recognized text file from said voice file using a speech recognition engine;

determining a score based on the recognized text file generated from the voice file and the associated text file of the voice file, wherein the score is based on the edit distance between the associated text file and the recognized text file and on results of the transcription provided by the speech recognition engines selected from the group consisting of the confidence of the recognition engine in each of the tokens recognized and the ability of the recognition engine to generate a recognized text file using guided recognition, and on the results of the transcription automatically measured during transcription by a transcriptionist selected from one of (a) the time it takes the transcriptionist to edit a recognized text file to bring it into conformity with a finished document or (b) the number of keystrokes it takes the transcriptionist to edit a recognized text file to bring it into conformity with a finished text file;

determining a preferred mode of transcription based on a predetermined number of scores, wherein the predetermined number of scores are scores generated from recognized text files and associated text files corresponding to voice files generated by the speaker; and setting a transcription mode for the speaker, wherein the transcription mode indicates the method of transcription thereafter used in the transcription system.

6. A transcription system comprising:

a server for accumulating a predetermined number of the speaker's voice files and associated text files, wherein the associated text files are transcriptions of the voice files transcribed by a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the transcription thereafter used in the transcription system.

7. A transcription system comprising:

a server for accumulating a predetermined number of the speaker's voice files and associated text files, wherein the associated text files are transcriptions of the voice files transcribed b a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on characteristics of the voice file selected from the group consisting of the number of pauses in the voice file, the amount of silence in the voice file, and the audio quality f the voice file, and is based on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the transcription thereafter used in the transcription system.

8. A transcription system comprising:

a server for accumulating a predetermined number of the speaker's voice files and associated text files, wherein the associated text files are transcriptions of the voice files transcribed by a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on characteristics of the recognized text file and associated text file selected from the group consisting of the amount of correction required to bring the recognized text file into conformity with the finished text file, the amount of out of order text in the recognized text file, and the amount of formatting in the associated text file, and further is based on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the transcription thereafter used in the transcription system.

9. A transcription system comprising:

a server for accumulating a predetermined number of the speaker's voice flies and associated text files, wherein the associated text files are transcriptions of the voice files transcribed by a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on characteristics of the voice file selected from the group consisting of the number of pauses in the voice file, the amount of silence in the voice file, and the audio quality of the voice file and on characteristics of the recognized text file and associated text file selected from the group consisting of the amount of correction required to bring the recognized text file into conformity with the finished text file, the amount of out of order text in the recognized text file, and the amount of formatting in the associated text file, and further is based on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker wherein the transcription mode indicates the transcription thereafter used in the transcription system.

10. A transcription system comprising:

a server for accumulating a predetermined number of the speaker's voice files and associated text files, wherein the associated text files are transcriptions of the voice files transcribed by a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on results of the transcription provided by the speech recognition engine selected from the group consisting of the confidence of the recognition engine in each of the tokens recognized and the ability of the recognition engine to generate a recognized text file using guided recognition, and further is based on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the transcription thereafter used in the transcription system.

11. A transcription system comprising:

a server for accumulating a predetermined number of the speaker's voice files and associated text files, wherein the associated text files are transcriptions of the voice files transcribed by a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on characteristics of the voice file selected from the group consisting of the number of pauses in the voice file, the amount of silence in the voice file, and the audio quality of the voice file and on results of the transcription provided by the speech recognition engine selected from the group consisting of the confidence of the recognition engine in each of the tokens recognized and the ability of the recognition engine to generate a recognized text file using guided recognition and further based on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the transcription thereafter used in the transcription system.

12. A transcription system comprising:

a server for accumulating a predetermined number of the speaker's voice files and associated text files, wherein the associated text files are transcriptions of the voice files transcribed by a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on characteristics of the recognized text file and associated text file selected from the group consisting of the amount of correction required to bring the recognized text file into conformity with the finished text file, the amount of out of order text in the recognized text file, and the amount of formatting in the associated text file, and on results of the transcription provided by the speech recognition engine selected from the group consisting of the confidence of the recognition engine in each of the tokens recognized and the ability of the recognition engine to generate a recognized text file using guided recognition, and further based on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the transcription thereafter used in the transcription system.

13. A transcription system comprising:

a server for accumulating a predetermined number of the speaker's voice files and associated text files, wherein the associated text files are transcriptions of the voice files transcribed by a transcriptionist;

a speech recognition engine, wherein a voice file is provided to said speech recognition engine and a recognized text file is generated therefrom;

a means for determining a score based on the recognized text file generated from the voice file and the associated text file of the voice file, wherein the score is based on the edit distance between the associated text file and the recognized text file and on characteristics of the voice file selected from the group consisting of the number of pauses in the voice file, the amount of silence in the voice file, and the audio quality of the voice file and on characteristics of the recognized text file and associated text file selected from the group consisting of the amount of correction required to bring the recognized text file into conformity with the finished text file, the amount of out of order text in the recognized text file, and the amount of formatting in the associated text file, and on results of the transcription provided by the speech recognition engine selected from the group consisting of the confidence of the recognition engine in each of the tokens recognized and the ability of the recognition engine to generate a recognized text file using guided recognition, and further based on results of transcription automatically measured during transcription by a transcriptionist selected from the group consisting of the time it takes the transcriptionist to edit a recognized text file to bring it into conformity with a finished text file and the number of keystrokes it takes the transcriptionist to edit a recognized text file to bring it into conformity with a finished text file;

a means for determining a preferred mode of transcription based on a predetermined number of scores, wherein the predetermined number of scores are scores generated from recognized text files and associated text files corresponding to voice files generated by the speaker; and a means for setting a transcription mode for the speaker, wherein the transcription mode indicates the transcription thereafter used in the transcription system.

* * * * *